United States Patent [19]

Schatz

[11] Patent Number: 4,932,465
[45] Date of Patent: Jun. 12, 1990

[54] HEAT STORAGE MEANS, MORE ESPECIALLY A LATENT HEAT STORAGE MEANS

[76] Inventor: Oskar Schatz, Waldpromenade 16, d 8035 Gauting, Fed. Rep. of Germany

[21] Appl. No.: 224,814

[22] Filed: Jul. 27, 1988

[30] Foreign Application Priority Data

Jul. 29, 1987 [DE] Fed. Rep. of Germany ....... 3725165

[51] Int. Cl.$^5$ ............................................. F28D 20/00
[52] U.S. Cl. ....................................... 165/10; 165/81; 220/437; 220/448
[58] Field of Search ............... 220/901, 447, 446, 448, 220/437–439; 165/10, 81

[56] References Cited

U.S. PATENT DOCUMENTS 3,782,128 1/1974 Hampton et al. .................... 220/901

Primary Examiner—Albert W. Davis, Jr.
Attorney, Agent, or Firm—Harness, Dickey & Pierce

[57] ABSTRACT

A heat storage means, mor especially a latent heat storage means for motor vehicle heating systems running on engine waste heat comprises an inner housing (10) enclosing a storage core, and an outer housing (12), between which housings there is thermal insulation (14), which has a supply duct (16) leading to the inner housing (10) and a drain duct (16) extending from the inner housing, running through it. The inner housing (10) is suspended at two remote end sides (20 and 50) by means of a respective group of ribs with a small cross section on the outer housing (12), and between one end wall (20) of the inner housing (10) and the outer housing (12) there is at least one spring (36) so placed that it tends to change the distance between oppositely placed end walls (20, 26; 50 and 28) of the inner and of the outer housings.

14 Claims, 2 Drawing Sheets

HEAT STORAGE MEANS, MORE ESPECIALLY A LATENT HEAT STORAGE MEANS

The invention relates to a heat storage means, more especially a latent heat storage means for motor vehicle heating systems using waste engine heat, comprising an inner housing enclosing a storage core, an outer housing enclosing the inner housing with a clearance therebetween, thermal insulation between the inner and the outer housings, a supply duct and a drain duct for a fluid to transport heat, such ducts extending through the thermal insulation to the inner housing.

In order to prevent losses of the stored heat to the greatest possible extent it is necessary to have a highly efficient insulation between the inner and the outer housings, there being more especially the requirement for a comparatively small volume of the insulation to ensure that the overall volume of the heat storage means may be kept small, as is more especially required for installation in motor vehicles, because only a small amount of space is available for additional equipment. In order not to additionally increase the weight of the vehicle, the weight of such a heat storage means should also be kept as low as possible.

An insulation which is more especially suitable for meeting all these needs is a vacuum gap between the inner housing and the outer housing. In this respect it is necessary to anchor the inner housing within the outer one, which for its part should have a minimum weight and cause only minimum heat losses.

Accordingly, the object of the invention is to design a heat storage means for the initially mentioned type such that the inner housing is located in the outer housing in the simplest possible and reliable manner, such anchoring means furthermore fulfilling the requirements of the least possible weight, the lowest possible thermal losses and allowance for thermal expansion taking place with fluctuations in temperature.

In order to achieve this object in the invention the inner housing is supported on two end faces facing away from each other by means of respective a group of ribs with a small cross section on the outer housing and in that between end wall of the inner housing and the outer housing at least one spring is so mounted that it tends to change the distance between opposite end walls of the inner and of the outer housing.

The anchoring in place of the inner housing within the outer one by suspension means offers the advantage the essentially only tensile forces have to be transmitted so that small cross sections are possible which on the one hand mean that the necessary weight on the one hand the thermal losses occurring on the other hand may be kept low. Each group of ribs comprises at least two and preferably about three or four ribs in order to oppose lateral displacement of the housing.

In accordance with an advantageous development of the invention the supply and drain ducts emerge at least in the proximity of the end wall of the inner housing with which the spring is in engagement. Owing to this a relative motion of the inner and of the outer housing adjacent to the pipe ducts is reduced and the tubes are relieved of mechanical loads.

In accordance with a particularly expedient for the invention the ribs of at least one group are united as a single suspension element so that assembly becomes particularly simple.

A further convenient development is such that at least one suspending means is connected in a torsionally stiff manner with the inner housing, there preferably being two spaced attachment points on one end wall of the inner housing in a symmetrical arrangement for the suspending means. In this respect a further convenient development then becomes possible inasfar as the suspending means has two connection points associated with the attachment points on the inner housing, and from such connection points there extend two ribs placed respectively V-like manner to an outer frame, which enclose the other connection point on their bisector between them so that the two pairs of ribs arranged in the form of a letter V intersect with the formation of a diamond-like inner frame.

The spring may be mounted either between mutually opposite end walls of the inner housing and of the outer one or between the end wall of the inner housing and the suspending element, associated with this end wall. Preferably, the spring engages the center of the end surface of the inner housing.

As a further convenient development of the invention the suspending element may be provided on the end wall, cooperating with the spring, of the inner housing with a central connection point, at which the ribs are united.

Preferably there is a guide sleeve on the end surface acted upon by the spring, for the spring and the central connection point of the suspending means is in the form of a ring fitting around this guide sleeve.

A further convenient development of the invention is such that the effective length of the spring is able to be adjusted.

Preferably the suspending elements are in the form of stampings.

On the basis the following description an account in more detail will now be given of the invention with reference to the working example shown in the drawing FIG. 1 shows an axial section taken through a heat storage means designed in accordance with the invention with a cylindrical shape of housing.

Figure 1:
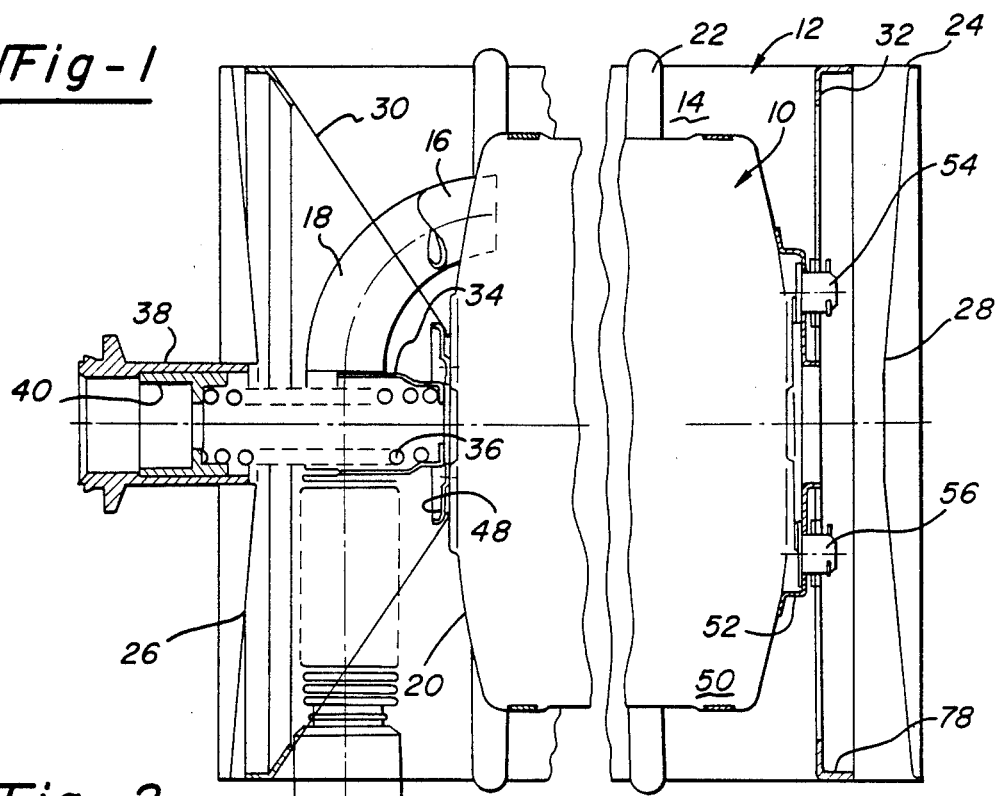

The heat storage means shown consists of an inner housing 10 and an outer housing 12, between which a vacuum chamber 14 is formed. A supply duct 16 and a drain duct 18 are connected in the upper part of an end wall 20 of the inner housing 10 and extend vertically through the vacuum chamber 14 downwards out of the outer housing 12.

The outer housing 12 consists of a cylindrical casing 24 reinforced by grooves 22 and two end walls 26 and 28 mounted in this casing 24. Adjacent to the left hand end wall 26 (see FIG. 1) there is a suspension element 30 on the inner side of the outer housing 12, it being attached for instance by welding. Adjacent to the right hand wall 28 there is a further suspension element 32 which is attached to the inner surface of the casing 24.

In the center of the left hand end wall 20 of the inner housing 10 there is mounted a guide sleeve 34 for a helical compression spring 26, same being held so as to be coaxial to the housings 10 and 12 between the inner housing 10 and outer one 12. The end wall 26, opposite to the end wall 20, of the outer housing also has a guide sleeve 38 for the compression spring 36, which is provided with an axially adjustable inert 40 for changing the effective length of the compression spring 36.

Figure 3:
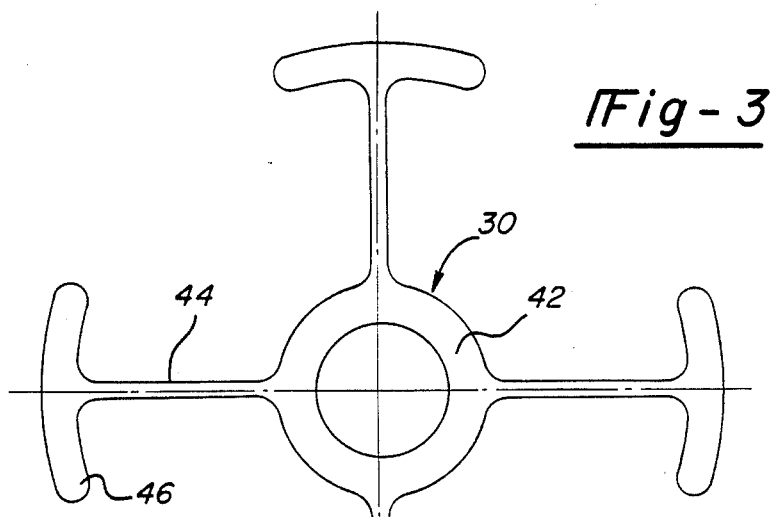
FIG. 3 is a view of the suspension element arranged on the left in FIG. 1.
Figure 4:
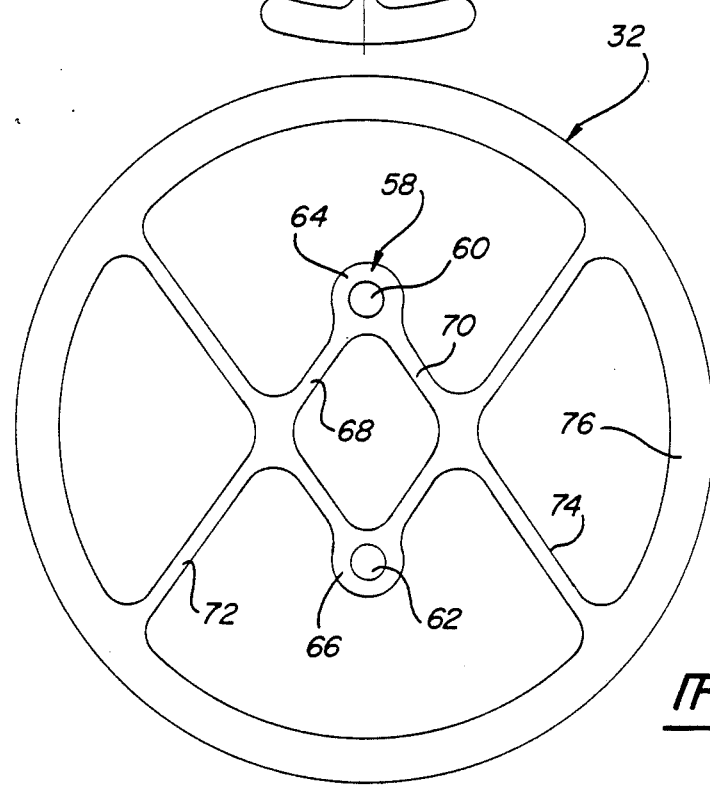
FIG. 4 is a view of the suspension element arranged on the right in FIG. 1.

The suspension element 30 (see FIG. 3) possesses a inner annular frame 42, from which there extend four radial ribs 44, each offset from the next one by 90°, which at there ends are provided with attachment flanges 46 for connection with the casing 24. The ribs 44 are in this respect so bent in relation to the plane of the inner frame 42 that they make an acute angle with the axis of the inner frame and are constantly kept stressed by the compression spring 36. In order to attach the inner frame 42 on the end wall 20 it is possible to employ a thrust plate 48, which also fits in an annular manner around the guide sleeve 34 and which is connected with the end wall 20 of the inner housing 10.

At the other end wall 50 of the inner housing 10 for connection of the suspension element 32 there is a bracket 52, on which in the vertical plane of symmetry of the inner housing 10 with the same spacing from the axis of this housing 10 two connection pins 54 and 56 are arranged with which on an inner frame 58 of the suspending element 32 two holes 60 and 62 are associated. Ribs 68 and 70 and, respectively, 72 and 74 extend in pairs from the sections 64 and 66, respectively, surrounding these holes 60 and 62, of the inner frame. The ribs 68 and 70 and, respectively, 72 and 74 of each pair of ribs are in each case arranged in the form of a letter V so that they unite in the section 64, and, respectively, 64 and the hole 62 or 60, respectively, arranged in the other respective section 66 and 64 is on its bisector and is enclosed by them. The two pairs of ribs 68 and 70 and, respectively 72 and 74 thus intersect with each other so that the inner frame 58 is diamond-shaped. The outer ends of the ribs 68 through 74 are connected with each other by an annular outer frame 76 with each other which has a bent part 78 able to be connected with the inner surface of the casing 24.

In this arrangement the suspending element 30 functions primarily to axially locate the inner housing 10 in relation to the outer housing 12, whereas the suspending element 32 serves primarily to maintain the set radial distance between the two housings 10 and 12 and at the same time prevents twisting of the two housings 10 and 12 in relation to each other.

Figure 2:
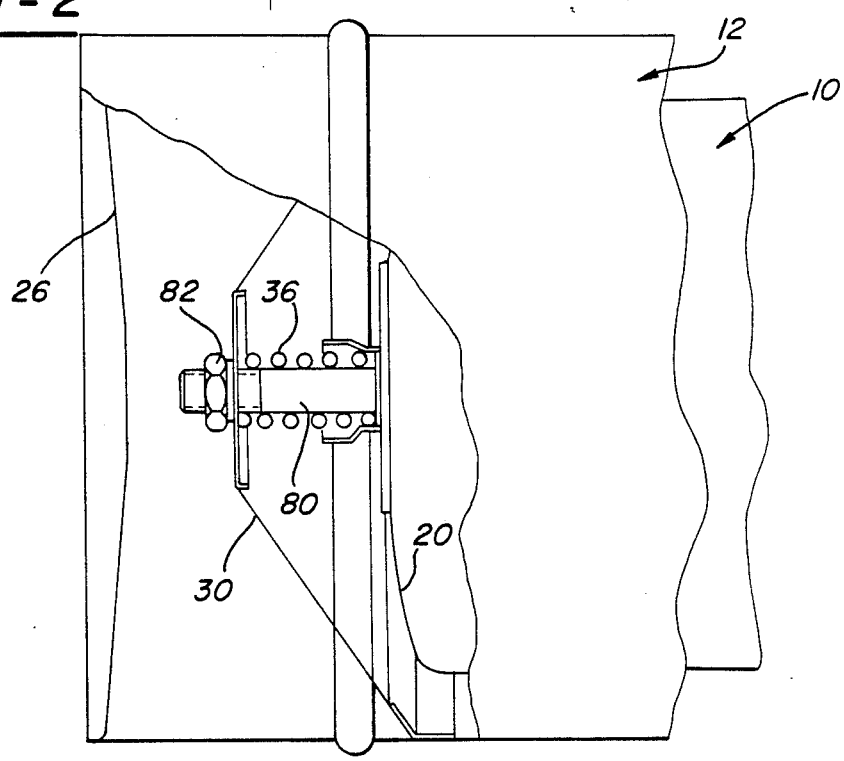
FIG. 2 shows a modification of the left hand end of the heat storage means of FIG. 1.

In lieu of placing the compression spring 36 directly between the inner housing 10 and the outer one 12, it is possible, as shown in FIG. 2, for instance to place the spring 36 directly on the inner housing 10 and for it to be indirectly connected with the outer housing 12 by causing one end of the compression spring 36 to bear on the end wall 20 of the inner housing 10 while its other end bears on the suspending element, the compression spring 36 having a guide pin 80 extending through it which is connected with the end wall 20 and on the pin 80 there is an adjustable nut 82 on the side of the suspending element 30 remote from the inner housing 10.

I claim:

1. A heat storage means, more especially a latent heat storage means for motor vehicle heating systems using waste engine heat, comprising an inner housing (10) enclosing a storage core, an outer housing (12) enclosing the inner housing (10) with a clearance therebetween, thermal insulation between the inner and the outer housings, a supply duct (16) and a drain duct (18) for a fluid to transport heat, such duct extending through the thermal insulation to the inner housing (10), characterized in that the inner housing (10) is supported on two end faces (20 50) facing away from each other by means of a respective group of ribs (44; 68, 70, 72 and 74) with a small cross section on the outer housing (12) and in that between end wall (20) of the inner housing (10) and the outer housing (12) at least one spring (36) adjustably mounted between said inner housing and outer housing so that it enables changing of its effective length which tends to change the distance between opposite end walls (20, 36; 50 and 28) of the inner and of the outer housing.

2. The heat storage means as claimed in claim 1, characterized in that at least the ribs (44) of one group extend obliquely in relation to the line of action of the spring (36).

3. The heat storage means as claimed in claim 1 or claim 2, characterized in that each group comprises at least two ribs (44; 68, 70, 72 and 74).

4. The heat storage means as claimed in claim 1, characterized in that the supply duct (16) and the drain duct (18) emerge at least partly in the proximity of the end wall (20) of the inner housing (10), with which the spring (36) is in engagement.

5. The heat storage means as claimed 1, characterized in that the ribs (44; 68, 70, 72 and 74) of at least one group are united to form a single suspension element (30; and 32).

6. The heat storage means as claimed in claim 5, characterized in that at least one suspending means (32) is connected with the inner housing (10) in such a manner as to prevent twisting.

7. The heat storage means as claimed in claim 5, characterized in that on one end wall (50) of the inner housing (10) two attachment points (54 and 56) for the suspending means (32) are provided in a symmetrical arrangement and with a spacing between them.

8. The storage means as claimed in claim 7, characterized in that the suspending means (32) comprises two connection points (60 and 62) associated with the attachment points (54 and 56) on the inner housing (10), from which two ribs (68, 70; 72 and 74) arranged respectively in the manner of a letter V run to an outer frame (76), which enclose between them the other connection point (62 and 60) of their bisector so that the two V-like pairs of ribs intersect with the formation of a diamond-like inner frame (58).

9. The heat storage means as claimed in claim 5, characterized in that the attachment elements (30 and 32) are in the form of stampings.

10. The heat storage means as claimed in claim 1, characterized in that the spring (36) is mounted between mutually opposite end walls (20 and 26) of the inner housing (10) and of the outer housing (12).

11. The heat storage means as claimed in claim 1, characterized in that the spring (36) is mounted between the end wall (20) of the inner housing (10) and the suspending elements (30) associated with this end wall (20).

12. The heat storage means as claimed in claim 10 or claim 11, characterized in that the spring (36) is supported in the middle of the end face (20) of the inner housing (10).

13. The heat storage means as claimed in claim 11, characterized in that the suspending element (30) is provided on the end wall (20) cooperating with the spring (36) of the inner housing (10) with a central connection point (42), at which the ribs (44) are united.

14. The heat storage means as claimed in claim 13, characterized in that on the end face (20), acting upon by the spring (36), there is a guide sleeve (38) for the spring (36) and the central connection point (42) of the suspending means (20) is in the form of a ring fitting around this guide sleeve (38).

* * * * *

UNITED STATES PATENT AND TRADEMARK OFFICE
CERTIFICATE OF CORRECTION

PATENT NO. : 4,932,465  Page 1 of 2

DATED : Jun. 12, 1990

INVENTOR(S) : Oskar Schatz

It is certified that error appears in the above-identified patent and that said Letters Patent is hereby corrected as shown below:

Title Page:
Abstract, Line 1, "mor" should be --more--;

Abstract, Line 7, "16" should be --18--;

Col. 1, Line 43, "respective a" should be --a respective--;

Col. 1, Line 51, "the" should be --that--;

Col. 1, Line 54, insert "and" after --hand-- (1st occurence);

Col. 2, Line 36, after "basis" insert --of--;

Col. 2, Line 38, "drawing" should be --drawings--;

Col. 3, Line 2, "inert" should be --insert--;

Col. 3, Line 4, "a" should be --an--;

Col. 3, Line 7, "there" should be --their--;

Col. 3, Line 30, "and" (1st occurrence) should be --or--;

Col. 3, Line 64, Claim 1, "duct" should be --ducts--;

Col. 4, Line 20, Claim 5, after "claimed" insert --in claim--;

Col. 4, Line 28, Claim 7, "claim 5" should be --claim 6--;

Col. 4, Line 33, Claim 8, after "The" insert --heat--;

UNITED STATES PATENT AND TRADEMARK OFFICE
CERTIFICATE OF CORRECTION

PATENT NO. : 4,932,465

DATED : June 12, 1990

INVENTOR(S) : Oskar Schatz

It is certified that error appears in the above-identified patent and that said Letters Patent is hereby corrected as shown below:

Col. 4, Line 57, Claim 13, "claim 11" should be --claim 12--.

Signed and Sealed this

Ninth Day of June, 1992

*Attest:*

DOUGLAS B. COMER

*Attesting Officer*  *Acting Commissioner of Patents and Trademarks*